United States Patent [19]
Flood et al.

[11] Patent Number: 5,953,638
[45] Date of Patent: *Sep. 14, 1999

[54] METHOD AND SYSTEM FOR AFFINITY TERMINATION OF CALLS

[75] Inventors: Robert J. Flood, Allen; William L. Wilson, Dallas, both of Tex.

[73] Assignee: MCI Communications Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,726

[22] Filed: Dec. 29, 1995

[51] Int. Cl.⁶ .............................. H04Q 7/08; H04Q 7/10; H04Q 1/12
[52] U.S. Cl. ................ 455/31.2; 455/31.3; 455/458; 455/412; 455/411; 455/403
[58] Field of Search ................................. 379/127, 201, 379/202, 207, 210, 211, 212, 214, 245, 246, 196, 197, 198, 188, 67, 113; 455/411, 412, 31.2, 31.3, 413

[56] References Cited

U.S. PATENT DOCUMENTS

| | | |
|---|---|---|
| 4,878,240 | 10/1989 | Lin et al. . |
| 5,029,196 | 7/1991 | Morganstein . |
| 5,146,490 | 9/1992 | Bechham .............................. 379/113 |
| 5,329,578 | 7/1994 | Brennan et al. ..................... 455/414 |
| 5,353,331 | 10/1994 | Emery et al. ....................... 379/211 X |
| 5,440,620 | 8/1995 | Slusky . |
| 5,561,703 | 10/1996 | Arledge et al. ....................... 455/31.2 |
| 5,610,970 | 3/1997 | Fuller et al. .......................... 455/31.2 |

FOREIGN PATENT DOCUMENTS

| | | |
|---|---|---|
| 0 445 452 A1 | 9/1991 | European Pat. Off. . |
| 0 501 903 A1 | 9/1992 | European Pat. Off. . |
| 0 510 411 A2 | 10/1992 | European Pat. Off. . |
| 0 516 900 A1 | 12/1992 | European Pat. Off. . |
| WO 91/07838 | 5/1991 | WIPO . |
| WO 94/06236 | 3/1994 | WIPO . |

OTHER PUBLICATIONS

IBM Technical Disclosure Bulletin, vol. 36, No. 06A, Jun. 1993.
D. Zeheb, "Secretarial Branch Exchange", *IBM Technical Disclosure Bulletine*, vol. 26, No. 5, Oct. 1983, pp. 2645–2647.

*Primary Examiner*—Wellington Chin
*Assistant Examiner*—Keith Ferguson

[57] ABSTRACT

The present invention is directed to affinity termination of telephone calls. The preferred embodiment of the present invention is a telephone switch which can be configured to terminate unanswered calls by paging the called party. Specifically, the telephone switch can be programmed by a user to communicate with specific pagers when unanswered telephone calls from specific calling telephone numbers to specific called telephone numbers are detected.

3 Claims, 4 Drawing Sheets

METHOD AND SYSTEM FOR AFFINITY TERMINATION OF CALLS

BACKGROUND OF THE INVENTION

1. Field of the Invention

The present invention relates generally to affinity termination of telephone calls, and more specifically to terminating telephone calls by relaying a message to a pager.

2. Related Art

A modem telephone switch may be integrated with voice mail boxes corresponding to telephone numbers associated with the telephone switch. When a called party is unavailable to answer their telephone, the telephone switch facilitates a calling party to record a message in the voice mail box of the called party. Subsequently, the called party can retrieve the message from their voice mail box at their convenience. However, the use of voice mail boxes does not ensure that the called party will promptly receive the message recorded by the calling party.

To promptly notify a called party of incoming telephone calls, a disperate system, such as a paging system, and a correspondingly distinct telephone number, must be used. A calling party dials the called party's paging telephone number and enters a message. The message may be, for example, the calling party's telephone number. The paging system then quickly relays the message to the pager of the called party. Typically, a called party carries their pager on their person so that they are promptly notified of the telephone calls made to their pager.

Thus, modem telephone systems suffer a disadvantage of requiring multiple telephone calls and other actions if a calling party desires to promptly contact a called party. If the calling party's initial telephone call goes unanswered, the calling party must leave a voice mail message. Then the calling party must call a second telephone number for a pager and enter a message to be relayed to the called party.

SUMMARY OF THE INVENTION

The present invention permits the use of a single telephone number through which a calling party can reach a called party in person, by voice mail, or through a pager. The called party can tailor the means of terminating unanswered telephone calls from specific calling telephone numbers to specific called telephone numbers.

The called party can configure a database so that the telephone switch forwards particular unanswered telephone calls, and any associated messages, to a pager. Alternatively, other specific unanswered telephone calls can be directed to voice mail that plays tailored messages.

To facilitate such flexibility, a programmable telephone switch database is used. The database is configured with records containing called telephone numbers associated with called parties whose telephones are connected to the telephone switch. The records may also contain telephone numbers associated with calling parties who are attempting to communicate with the called parties. Based on one or more of these criteria, along with a time criteria, a page is automatically placed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overwiew and Discussion of the Invention

The present invention is directed toward a telephone switch that facilitates flexible termination of unanswered telephone calls. This result is accomplished by incorporating a database with the telephone switch. To this end, the database may be programmed with telephone numbers, time ranges, and methods of terminating unanswered calls. Hence, when the database recognizes that a telephone call from a specific calling party to a specific called party has gone unanswered, the telephone switch terminates the telephone call in a way designated by the database.

Figure 1:
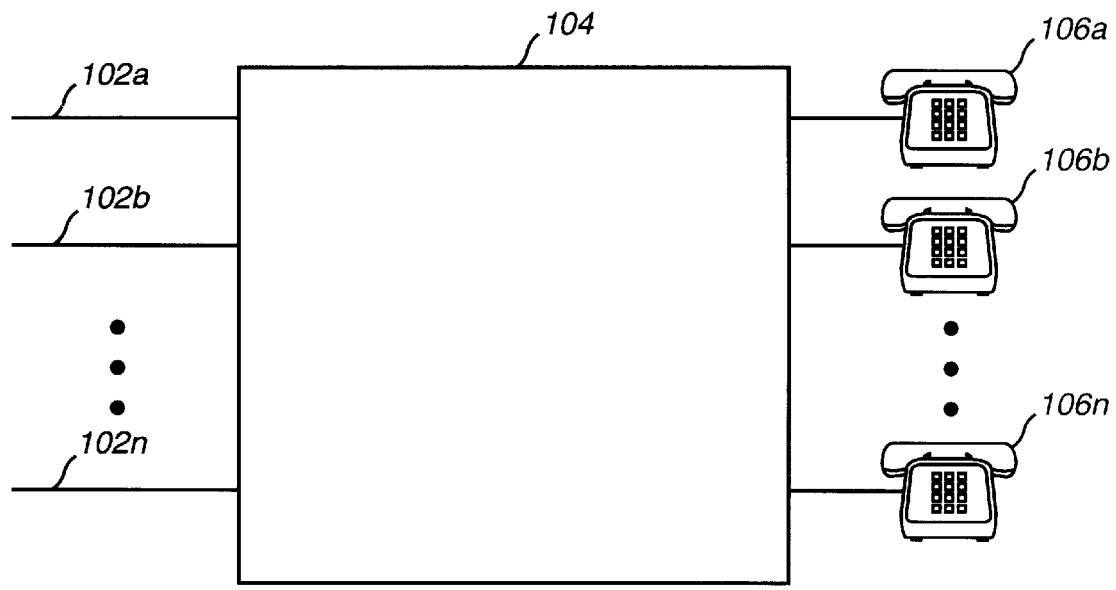
FIG. 1 illustrates a block diagram of one embodiment of the present invention.

FIG. 1 illustrates one embodiment of the present invention, a telephone system 100. The telephone system 100 comprises telephone lines 102a, 102b . . . 102n (generally designated 102), a telephone switch 104, and telephones 106a, 106b . . . 106n (generally designated 106). The telephone lines 102a, 102b . . . 102n, couple the telephone system 100 to external telephone systems (not shown).

Each telephone 106 is associated with one or more unique telephone numbers. Telephone calls made from the telephones 106 are routed by the telephone switch 104 to an available telephone line 102 coupled to the external telephone systems corresponding to the called telephone numbers.

Correspondingly, telephone calls made from the external telephone systems to the telephones 106 are routed by the telephone switch 104. In this scenario, the external telephones are associated with calling telephone numbers, and the telephones 106 are associated with called telephone numbers. Each telephone call may or may not have an automatic number identifier (ANI) associated with it. The ANI corresponds to the calling telephone number. The caller may be coupled to the telephone switch 104 or coupled to a switch that communicates with telephone switch 104.

Figure 2:
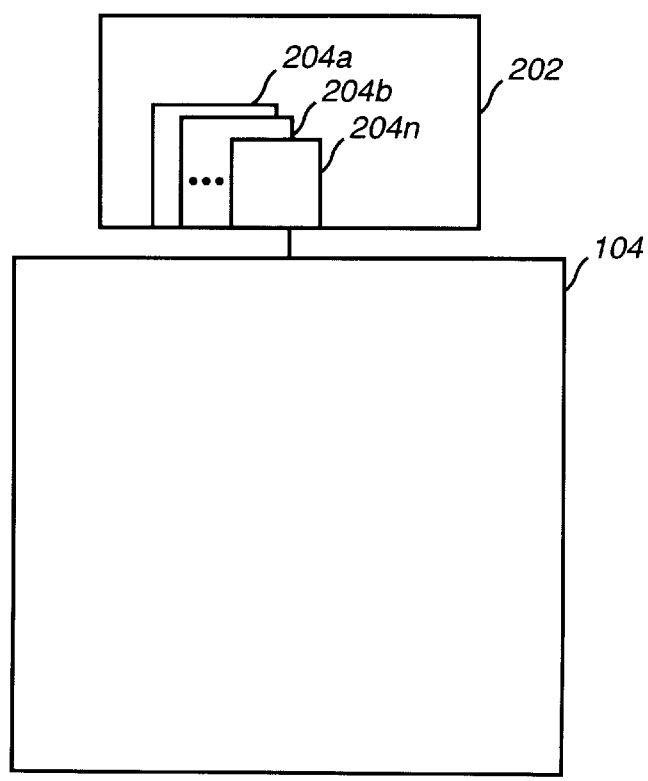
FIG. 2 illustrates one embodiment of a telephone switch of the present invention.

FIG. 2 illustrates one embodiment of the telephone switch 104. The telephone switch 104 accesses a database 202 including records 204a, 204b . . . 204n (generally designated 204). The telephone switch 104 uses the database to determine how to terminate an unanswered telephone call made to a called party. The unanswered telephone call may be terminated with customized messages or telephone call forwarding to a pager. The database 202 may be incorporated in or remotely located away from the telephone switch 104.

2. Preferred Embodiment

The preferred embodiment of the present invention is a telephone switch that may be programmed to terminate unanswered telephone calls by sending a message to a pager. The preferred embodiment of the present invention permits sending messages to pager telephone numbers that are tailored to called telephone numbers, calling telephone numbers, and time of day. This functionality is implemented by appropriately programming the database 202.

Figure 3:
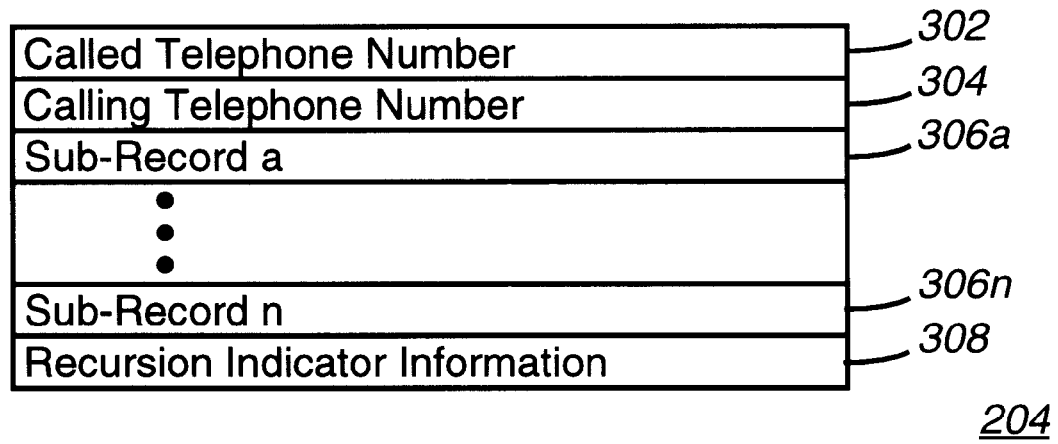
FIG. 3 illustrates one embodiment of a record of the present invention.

FIG. 3 illustrates a preferred embodiment of the record 204 of the database 202. Each record 204 comprises one or more fields which contain specific information. The preferred embodiment of the record 204 includes the following fields:

(1) called telephone number 302;

(2) calling telephone number 304;

(3) sub-records 306a, 306b . . . 306n (generally designated 306); and (4) recursion indicator information 308.

The called telephone number field 302 contains a telephone number corresponding to a specific called party whose telephone 106 is coupled to the telephone switch 104. The calling telephone number field 304 contains a telephone number corresponding to a specific calling party. Explicit telephone numbers, wildcards, or a combinations thereof can be respectively entered into the called and calling telephone number fields 302, 304.

Figure 4:
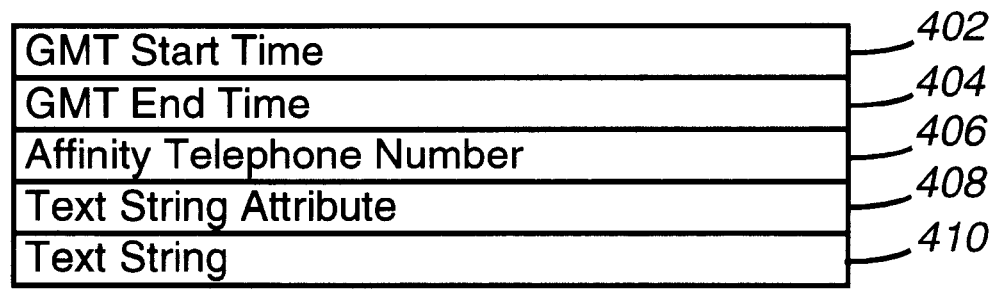
FIG. 4 illustrates one embodiment of a sub-record of the present invention.

The information in the sub-records 306 define the messages and pager telephone numbers that terminate unanswered telephone calls from specific calling telephone numbers to specific called telephone numbers. The latter telephone numbers are stored in corresponding fields 302, 304 of the record 204. The sub-records 306 also facilitate different stored messages to be relayed to different pager telephone numbers at different times of the day. As shown in FIG. 4, the preferred embodiment of the sub-records includes the following fields:

(1) start time 402;

(2) end time 404;

(3) affinity telephone number 406

(4) text string attribute 408; and (5) text string 410.

The start and end time fields 402, 404 define a time period in which corresponding fields of the sub-record 306 are to be enabled. The times in these fields are recorded in Greenwich Mean Time (GMT).

The start and end time fields may contain null values. In this case, the sub-record 306 becomes a default record which is used if a sub-record 306 does not exist with an appropriate time range.

The other fields corresponding with the start and end time fields include the affinity telephone number 406, text string attribute 408, and text string 410. The affinity telephone number field 406 contains the telephone number to which the telephone switch 104 places the page. The text string 410 contains a stored message that can be relayed to the called party through a pager if the text string attribute 408 is appropriately set.

The text string attribute field 408 is a flag that may have three settings: (1) ignore; (2) override; and (3) add. When the text string attribute field 408 is set to ignore, the stored message in the text string field 410 will not be relayed to the pager of the called party if the calling party sends an incoming message. When the text string attribute 408 is set to override, the stored message in the text string field 410 is sent to the pager of the called party, whereas any incoming message from the calling party is not sent. Finally, if the text string attribute field 408 is set to add, the stored message in the text string field 408 will be sent to the pager with any incoming message sent by the called party.

Referring again to FIG. 3, the recursion indicator information field 308 is both a flag and a pointer to another record 204. If data is present in the recursion indicator information field 308, there by being a flag, then the telephone switch 104 retrieves a different record 204 according to pointer information in the recursion indicator information field 308. The data is a pointer because it contains called and calling telephone numbers. The data is used to obtain a different record 204 as though the database 202 is being searched for the first time by called and calling telephone numbers.

Figure 5:
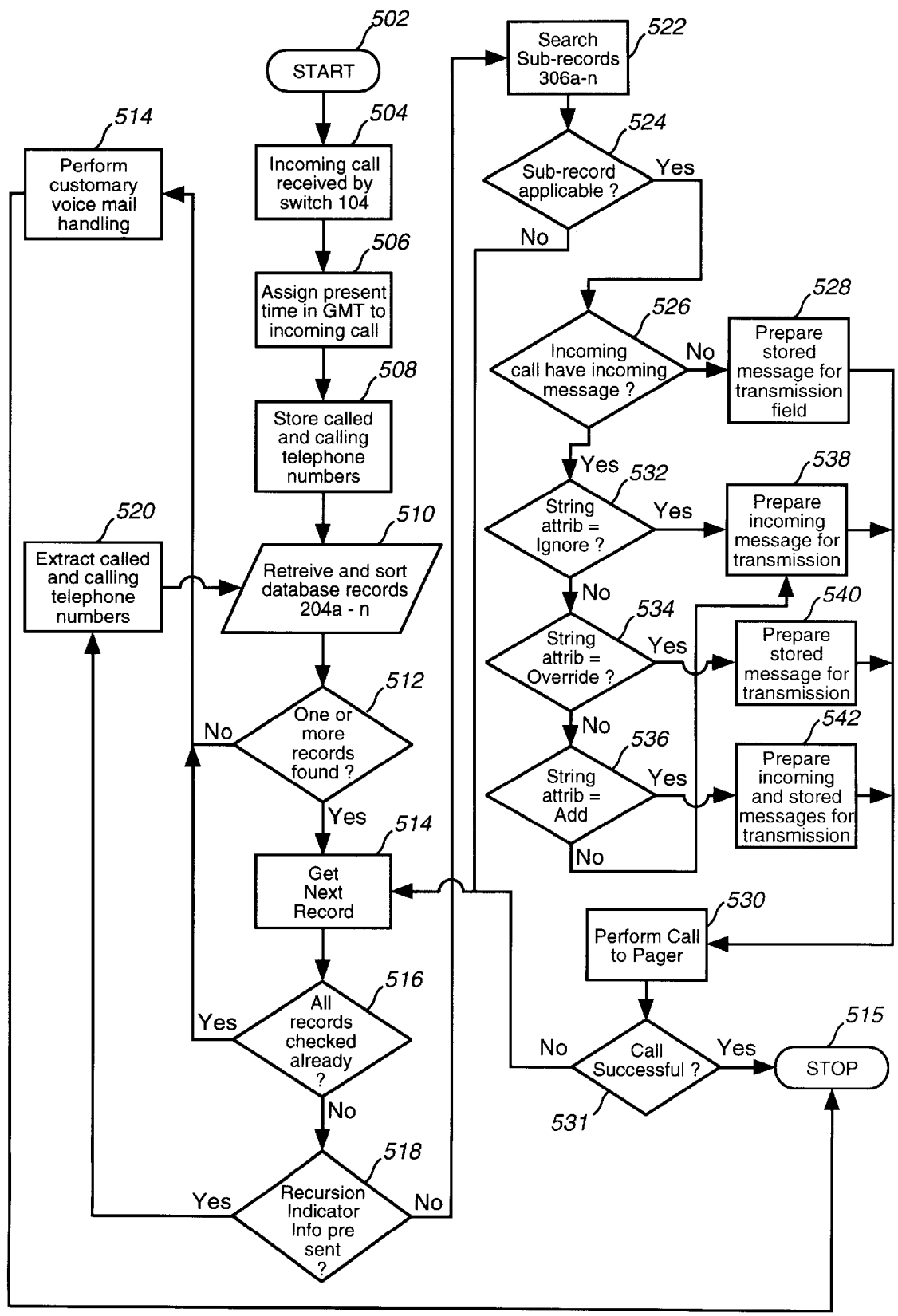
FIG. 5 illustrates a flow chart of one embodiment of operation of the present invention.

FIG. 5 illustrates one embodiment of operating the present invention. Upon commencing operation of the present invention (step 502), an incoming telephone call may be received by the telephone switch 104 (step 504). Upon its receipt, the telephone switch 104 assigns the present time in GMT to the incoming call (step 506). The telephone switch 104 then stores the called telephone number and any applicable calling telephone number (step 508). There may or may not be caller identification information associated with the telephone call. The calling telephone number is derived from the ANI as described above. An unavailable ANI results in a null setting of the stored calling telephone number (step 508).

Next the telephone switch 104 retrieves and sorts records 204 from the database that correspond to the called telephone number and calling telephone number (step 510). All records with either the called telephone number, or calling telephone number, or both called and calling telephone numbers are retrieved. Wild card characters may be used in the called or calling telephone numbers stored in the database 202. Records 204 are sorted by descending priority. Records 204 with both explicit called and calling telephone number fields 302, 304 have the highest priority. Records 204 with only an explicit calling telephone number field 302 have the second highest priority. Records with only an explicit called telephone number field 304 have the third highest priority. Records 204 are then prioritized by the number of wildcard characters in the called and calling telephone number fields 302, 304. Thus, more explicit telephone number fields 302, 304 have higher priority. Therefore, a field with more explicit alpha-numeric characters has higher priority than a field with fewer explicit alpha-numeric characters. The sorting process will remove any duplicate records 204.

Next, the telephone switch 104 determines if at least one record 204 corresponding to the called and calling telephone numbers was retrieved from the database (step 512). If no records 204 were retrieved, then the telephone switch 104 performs voice mail termination of the incoming call (step 514) and terminates the call in a customary manner (step 515).

Alternatively, if the telephone switch 104 determines that at least one record 204 was retrieved, the telephone switch 104 obtains the highest unobtained priority record 204 (step 514). Next, the telephone switch 104 determines whether such a record was obtained (step 516). In other words, the telephone switch 104 determines if all records 204 have been previously processed by a processing loop started by step 514. If no such record was obtained, then the incoming telephone call is terminated as was described above with respect to steps 514 and 516.

Next, the telephone switch 104 determines whether data is present in the recursion indicator information field 308 (step 518). If data is present, then the telephone switch 104 extracts the called and calling telephone numbers from the recursion indicator information field 308 (step 520). Then the telephone switch 104 retrieves and sorts records 204 with corresponding called and calling telephone numbers (step 510), as described above. The telephone switch will then repeat the subsequent steps, such as step 512, as described above. Thus, the recursion indicator information field 308 enables pointing to another record 204 in the database 202.

If no pointer is found in the recursion indicator information field 308, then the telephone switch 104 sequentially searches through the corresponding sub-records 306 for the first sub-record 306 having a time period corresponding to the time of the incoming telephone call (step 522). In case an explicit time range is not found, the telephone switch 104 may select a default sub-record 306 which is specified with a null start and end time.

Next, the telephone switch 104 determines whether an applicable subrecord was obtained (step 524). If no applicable sub-record was obtained, the telephone switch 104 obtains the next highest priority record (step 514) and repeats the process described above. Thus, if no sub-record 306 has a time period that corresponds to the time associated with the incoming telephone call, then the process loops from step 524 to step 514.

However, if a sub-record 306 with the appropriate time range, or period, was obtained (step 524), then the telephone switch 104 determines whether the incoming telephone call contains an incoming message (step 526). If the incoming telephone call does not contain an incoming message, the telephone switch 104 prepares the stored message in the text string field 410, if any, of the selected sub-record for transmission (step 528). Then the telephone switch 104 calls the pager whose telephone number is in the affinity telephone number field 406 and relays any message (step 530). If the telephone switch 104 determines that the telephone call to the pager is successful (step 531), the telephone switch 104 terminates call handling (step 515). If the telephone call to the pager (step 530) is not successful, the telephone switch 104 obtains the next highest priority record (step 514) and repeats the previously described process.

If the incoming telephone call includes an incoming message, then the telephone switch 104 evaluates the text string attribute field 408 (steps 532, 534, 536). First, the telephone switch 104 determines whether the text string attribute field 408 is set to ignore (step 532). If the text string attribute field 408 is set to ignore, the telephone switch 104 prepares the incoming message of the incoming telephone call, if any, for transmission to the pager (step 538). Subsequently, the telephone switch 104 calls the pager at the telephone number in the affinity telephone number field 406 (step 530) and continues with the succeeding steps described above.

If the text string attribute field 408 is not set to ignore, the telephone switch evaluates whether the text string attribute field 408 is set to override (step 534). If the telephone switch 104 detenmines that text string attribute field 408 is set to override, the telephone switch 104 prepares the stored message in the text string field 410, if any, to be sent to the pager (step 540). Subsequently, the telephone switch 104 calls the pager at the telephone number in the affinity telephone number 406 (step 530) and relays any message. Thereafter processing continues with the steps described above.

If the text string attribute field 408 is not set to override, the telephone switch 104 evaluates whether the text string attribute field 408 is set to add (step 536). If the telephone switch 104 determines that the text string attribute field 408 is set to add, the telephone switch 104 prepares the incoming message and stored message, if any, for transmission to the pager. Subsequently, the telephone switch 104 calls the pager at the telephone number in the affinity telephone number field 406 (step 530), and relays the message(s), and continues with the steps described above.

Then, if the text string attribute field 408 is not set to add, the telephone switch 104 prepares the incoming message to be sent to the pager (step 538). Subsequently, the telephone switch 104 calls the pager at the telephone number in the affinity telephone number field 406 (step 530) and relays the incoming message. Thereafter processing continues with the steps described above.

Figure 6:
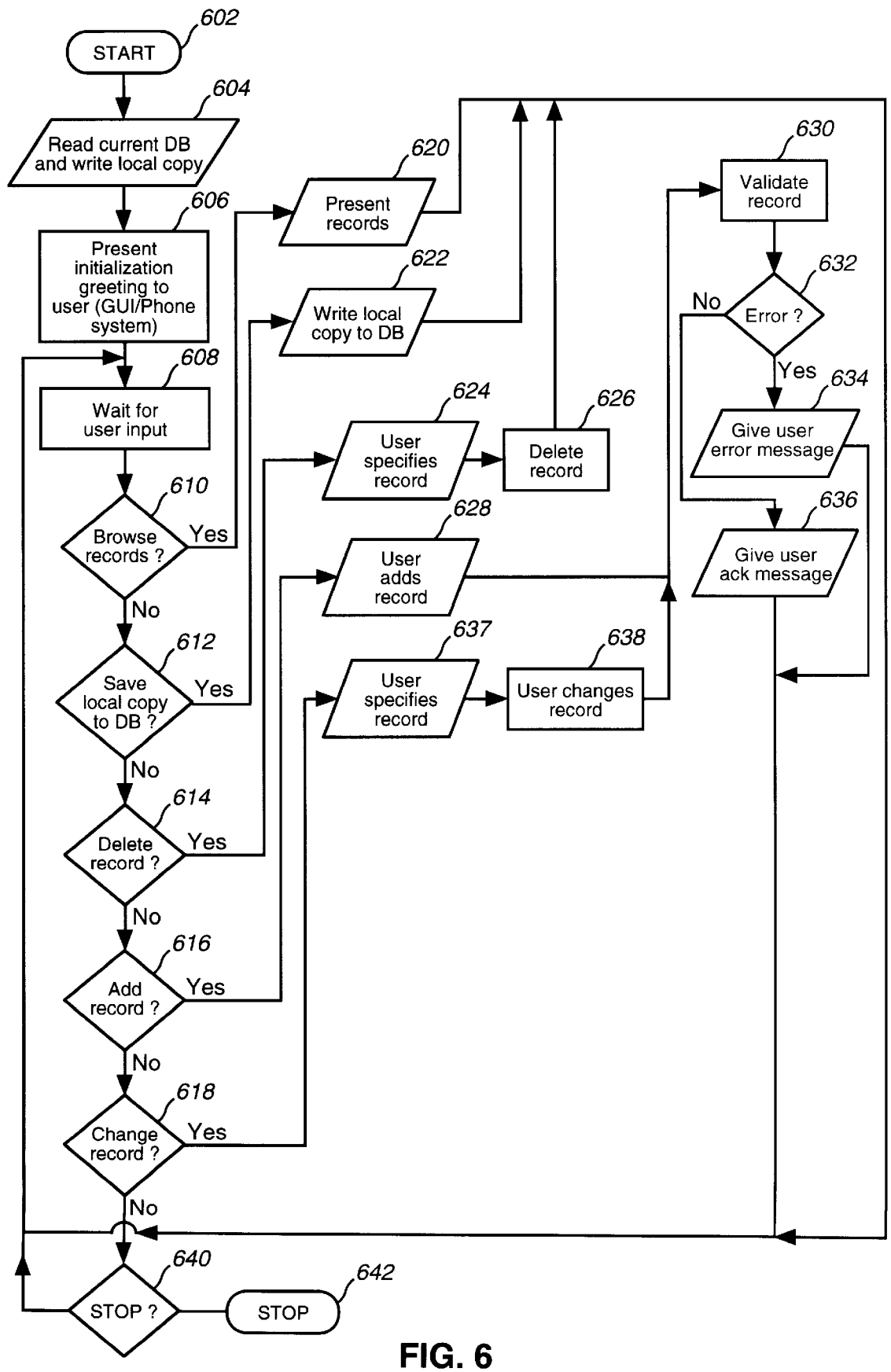
FIG. 6 illustrates one embodiment of user operation of the present invention.

FIG. 6 illustrates one embodiment of user operation of the present invention. Typically, the user is a called party who has a telephone 106 coupled to the telephone switch 104. However, the user may be also be a telephone system administrator. In one embodiment, the user can maintain the database 202 using a dual tone modulation frequency (DTMF) keypad as is conventionally found in a touchtone telephone. In another embodiment a graphical user interface of a personal computer may be used to maintain the database 202.

Upon commencing user operation (step 602), the telephone switch 104 creates a working, or local, copy of the database 202 (step 604). The user is then presented with an audio greeting and/or a graphical user interface (step 606). The process then waits for user commands or inputs (step 608). In the DTMF interface embodiment of the present invention, the user can use a special key, e.g. '*', on the DTMF keypad to return to this point during any time of user operation of the telephone switch 104.

The user can perform a variety of operations on the database 202. First, the user can opt to browse records in the working copy of the database 202 (step 610). If the user selects this option, then the user can review all records, each of which is associated with a reference number which can be utilized to delete or change the record 202 (step 620).

Alternatively, the user can opt to save the working copy of the database 202 as the permanent copy of the database 202 (step 612). In this event, the working, or local, copy of the database 202 is saved as the permanent database 202 (step 622).

The user may also opt to delete a record 204 from the working copy of the database 202 (step 614). To delete a record, the user must specify the record 204 to be deleted by a reference number made available to the user in step 620 (step 624). The telephone switch 104 then deletes the specified record (step 626).

The user can opt to add a record 204 to the working copy of the database 202 (step 616). Upon choosing this option, the user adds a record 204 (step 628). Subsequently, the telephone switch 104 validates, or verifies, that the new record has been properly entered (step 630). After the validation (step 630), the telephone switch 104 determines whether the user made an error in the data entry (step 632). If the telephone switch 104 determines that an error has occurred, it notifies the user of the error (step 634). Alternatively, if the telephone switch 104 determines that no error has occurred, it notifies the user that the record 204 was properly entered (step 636).

The user can opt to change, or edit, the records 204 of the database 202. If this option is selected, the user must specify a reference number made available to the user in step 620 (step 637). Thereafter the user edits the record 204 (step 638). Subsequently, the telephone switch 104 validates that the new record has been properly entered (step 630) and performs the other successive steps described above.

The user can also opt to quit, or exit, operation of the telephone switch 104 (step 640). If the user chooses to quit operation, then the telephone switch 104 terminates user access (step 642). Steps 608–618, 640, and associated steps, form a user interface processing loop to facilitate the user in managing the database 202.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of affinity call termination in a telephone system comprising the steps of:

(1) receiving an unanswered incoming telephone call;

(2) assigning a time to said unanswered incoming telephone call;

(3) determining the called and calling telephone numbers associated with said unanswered incoming telephone call;

(4) retrieving one or more records from a database that correspond with said called and calling telephone numbers, wherein each one of said records includes a text string attribute field and a text string field;

(5) sorting said records by priority;

(6) retrieving one of said records;

(7) determining whether any sub-record in said one of said records has a time range corresponding to said assigned time;

(8) terminating said incoming telephone call by calling a pager at an affinity telephone number identified in said one of said records having at least one of said time range, said called telephone number and/or said calling telephone number corresponding to said unanswered incoming telephone call;

(9) analyzing a text string attribute field;

(10) sending an incoming message associated with said unanswered telephone call to said pager if said text string attribute field is set to ignore;

(11) sending a message stored in said text string field to said pager if said text string attribute field is set to override; and

(12) sending said incoming message associated with said unanswered telephone call and said message stored in said text string field to said pager if said text string attribute field is set to add.

2. A method of affinity call termination in a telephone system comprising the steps of:

(1) receiving an unanswered incoming telephone call;

(2) assigning a time to said unanswered incoming telephone call;

(3) determining the called and calling telephone numbers associated with said unanswered incoming telephone call;

(4) retrieving one or more records from a database that correspond with said called and calling telephone numbers, wherein each one of said records includes a text string attribute field, a text string field and a recursion indicator information field;

(5) determining if one of said records has data in said recursion indicator information field;

(6) retrieving a new record corresponding to said called and calling telephone numbers in said data, if said data is found in said recursion indicator field;

(7) sorting said records by priority;

(8) retrieving one of said records;

(9) determining whether any sub-record in said one of said records has a time range corresponding to said assigned time;

(10) terminating said incoming telephone call by calling a pager at an affinity telephone number identified in said one of said records having said time range, said called telephone number and said calling telephone number corresponding to said unanswered incoming telephone call;

(11) analyzing a text string attribute field;

(12) sending an incoming message associated with said unanswered telephone call to said pager if said text string attribute field is set to ignore;

(13) sending a stored message in said text string field to said pager if said text string attribute field is set to override, and

(14) sending said incoming message associated with said unanswered telephone call and said stored message in said text string field to said pager if said text string attribute field is set to add.

3. The method of claim 2, further comprising the steps of retrieving another one of said records if said one of said records does not contain said time range, said called telephone number and said calling telephone number, and terminating said incoming telephone call by calling said pager at an affinity telephone number identified in said another one of said records.

* * * * *